July 23, 1968  I. E. COX ET AL  3,394,035
BATTERY CLOSURE
Filed July 25, 1966
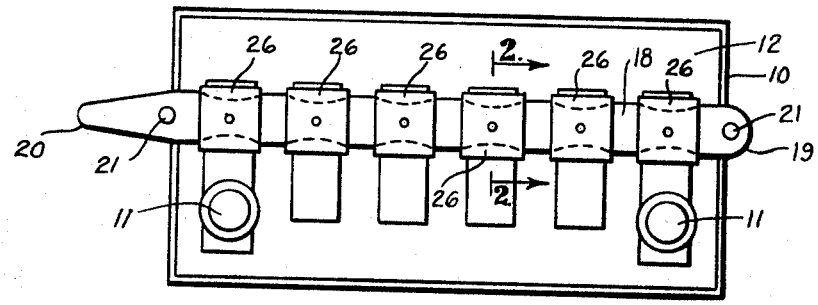
*Fig. 1.*
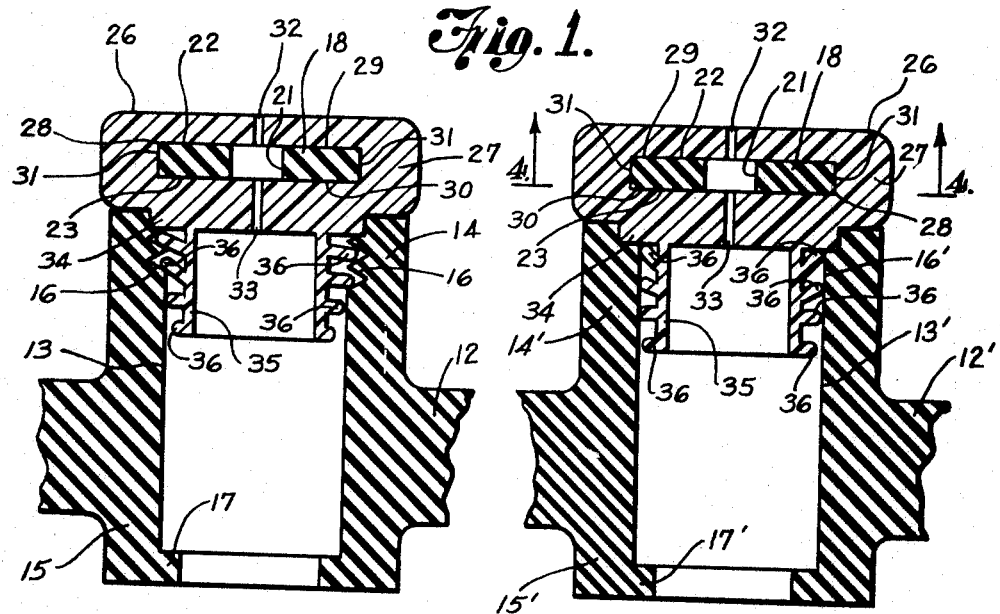
 
*Fig. 2.*  *Fig. 3.*
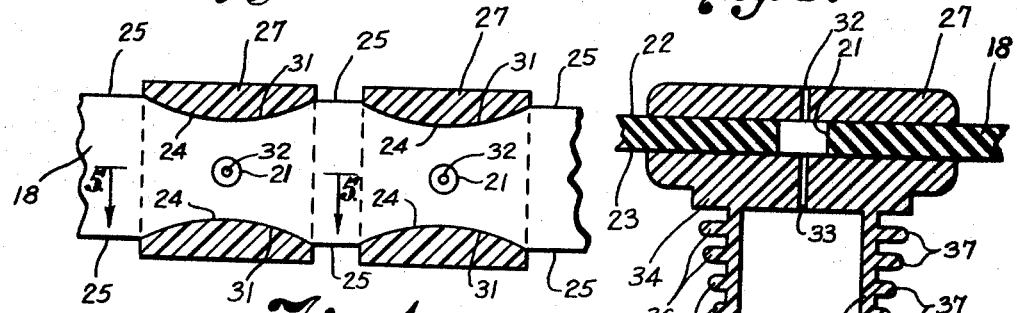
 
*Fig. 4.*  *Fig. 5.*
INVENTORS
IVAN E. COX
RUSSELL W. FRITTS
BY
Alfred R. Fuchs
ATTORNEY United States Patent Office 3,394,035
Patented July 23, 1968

3,394,035
BATTERY CLOSURE
Ivan E. Cox, 4740 Broadway 64112, and Russell W. Fritts, 2320 Gillham Road 64108, both of Kansas City, Mo.
Filed July 25, 1966, Ser. No. 567,489
8 Claims. (Cl. 136—177)

Our invention relates to battery closures and more particularly to a multiple closure for the fill openings of storage batteries. The present invention is an improvement over the invention disclosed in our application Ser. No. 386,357, filed July 30, 1964, now U.S. Patent 3,287,173, on Battery Closure.

It is the purpose of our invention to provide a multiple closure for the fill openings of storage batteries, that have plug portions that are adapted to engage in the fill openings of a storage battery, by merely pushing the plug portions into said openings, and to be disengaged from said openings, by merely pulling on the mounting of the closure members. This makes it possible to very quickly close the fill openings of a storage battery after servicing the same, and also very quickly attain acceess to said fill openings to service the battery, compared with the usual process of screwing vented plugs into and out of position with respect to the fill opening.

It is a particular purpose of the present invention to provide such a multiple closure that is adapted to engage in threaded fill openings of a storage battery of various diameters or unthreaded openings of various diameters and yet hold the plug portion in position in the openings. This is accomplished by providing the plug portion with a plurality of thin flexible ribs or annular flanges that are of gradually increasing diameter in a direction from the bottom or inner end of the plug portion toward the upper or outer end thereof.

The plug portions are made of plastic material, preferably polyethylene, of such flexibility that at least one of said flanges or ribs will be distorted upon the plug being pushed into the fill opening, whether threaded or unthreaded, so as to firmly hug the wall of said opening either at one of said threads or in the case of an unthreaded opening, the unthreaded wall, so as to hold the plug in the opening against accidental disengagement from the opening.

It is another purpose of our invention to provide a closure for storage batteries that comprises a mounting member for a plurality of the above referred to closure members, which consists of a flexible and extensible rubber band that is provided with means for mounting the plug portions in predetermined spaced relation along the length of said band, said closure members each having a body portion with a slot therethrough for receiving said band, which body portion is provided with a depending plug portion, each portion for closing one of the fill openings, such as above referred to, the slots through the body portions of the closure members being rectangular in cross section, having flat parallel top and bottom walls and convexly curved side walls, to provide slots that are of uniform height and gradually decreasing in width from each end thereof to a midportion of minimum width.

It is a further purpose of our invention to provide a mounting band, such as above referred to, that is provided with concave recesses in the longitudinal side edges thereof that are located at predetermined spaced distances from each-other and are arranged opposite each other, so that the one pair of opposed recesses will cooperate with a body portion of one of said closure members. The recesses in said side edges of said mounting band are preferably of the same size and shape as the convex side walls of the slot, so as to closely receive the same. Inasmuch as the mounting band portions between said recesses, are of greater width than the recessed portions, it is necessary that the mounting band be made of a flexible, extensible rubber material that is capable of being stretched sufficiently that the wider portions of the band will be reduced to such a cross section that the body portions of the plugs can be moved along lengthwise on the same each into its position at one of the recessed portions.

It has been found that neoprene of the desired flexibility and extensibility is the most desirable material to use for said band. Also, because of the flexibility that can be provided for the flexible flanges or ribs on the plug portions of the closure members by the use of polyethylene, polyethylene is preferably used for the body portions of the closure members. By the use of neoprene for the mounting band, a mounting band that is resistant to oil, gasoline and acid is provided, which retains its flexibility for all ranges of temperature encountered in the use thereof. It is to be understood that, while the mounting band is extended or stretched during the assembly of the closure members therewith, this is not the case after assembly is completed and the apparatus is in position on a battery, as any tension on the band would tend to cause the plug portions of the closure members to be disengaged from the walls of the fill openings.

By providing a plug portion that is relatively short and which has flexible gripping means thereon that engages the fill opening wall at or near upper end, the likelihood of any acid being flipped out of the battery, by removal of the closure members from their openings, by an upward pull on the mounting band, is avoided. This is because the plug portions are widely spaced from the top surface of the battery electrolyte.

Other objects and advantages of our invention will appear as the description of the drawings proceeds. We desire to have it understood, however, that we do not intend to limit our invention to the particular details shown or described except as defined in the claims.

In the drawings:

FIG. 1 is a top plan view of a battery showing our invention applied thereto.

FIG. 2 is a fragmentary, greatly enlarged, sectional view taken on the line 2—2 of FIG. 1.

FIG. 3 is a view similar to FIG. 2 showing our invention applied to an unthreaded fill opening.

FIG. 4 is a fragmentary view taken on the line 4—4 of FIG. 3, on a slightly reduced scale, and FIG. 5 is an enlarged sectional view taken on the line 5—5 of FIG. 4.

Referring in detail to the drawings, in FIG. 1 is shown a storage battery 10, which is provided with a plurality of cells that are connected in series, each of said batteries being provided with the end terminals 11 for connecting conductors thereto. The battery is ordinarily provided with a cover member 12, which is provided with fill openings 13, which have upward tubular extensions 14 above the main body portion of the cover member 12 and tubular extensions 15 downwardly therefrom. The upward tubular extensions 14 of the fill opening is provided with internal threads 16 extending downwardly a short distance from the upper end thereof. The downward extension 15 of said fill opening is provided with an inwardly directed flange, or lip, 17 at the bottom end thereof.

In FIG. 3 a slightly modified form of battery cover member 12' is shown in which the fill openings 13' have smooth internal walls 16' at their upward extensions 14' and have downward extensions 15' that are provided with lips or flanges 17' similar to the flanges 17. The two types of battery covers, above referred to, have fill openings of varying diameters and it is one of the purposes of the applicants' structure to provide a closure member that will be adapted to be used on any of the battery covers whether internally threaded or smooth surfaced at their fill openings, and no matter what slight variations in diameter there may be in said fill openings for different types of battery covers.

Our improved battery closure member comprises a flexible band 18 which is made of an artificial rubber material, preferably Neoprene, that has great flexibility and considerable extensibility. Said rubber band 18 is preferably provided with a rounded end 19 and a tapered end 20 and is provided with a row of vent openings 21 therein that lie on substantially the longitudinal centerline of the band 18. The band 18 is made of a rubber material of such flexibility that the tapered end 20 thereof will tend to hang down slightly where it extends beyond the ends of the battery 10. The material of the band 18, while extensible and flexible, has sufficient stiffness to maintain the portion thereof extending between the cells of the battery in a substantially horizontal position without sagging. Said band is rectangular in cross section having flat top and bottom faces 22 and 23, however the side walls of said band have portions of varying width, and while the side edges thereof extend perpendicularly to the top and bottom 22 and 23, the side edges are provided with concave recesses 24, and with straight parallel side edge portions 25 lying between the recesses 24. The curvature of the concave walls of the recesses is rather gradual, as will be obvious from FIG. 4, and the wider portions at the straight side walls 25 are relatively short. The spacing of said recesses 24 will depend upon the fill openings of the battery. The vent openings 21 it will be noted are midway of the length of the recesses 24 in the side edges, at the narrowest portions of said band.

Mounted on the band 18 are the closure members 26, which have the main body portions 27 that are substantially square in plan and which are provided with slots 28 that extend through the same in the direction of length of the band 18. Said slots are provided with flat top and bottom walls 29 and 30, that correspond to the flat top and bottom walls 22 and 23 of the band 18, and with convexly curved side walls 31 that are curved on substantially the same arc as the concave recesses 24 so as to fit in the same, as shown in FIG. 4. Thus, while the slots are rectangular in cross section, they vary in width so as to gradually decrease in width from the opposite ends thereof to the middle thereof. The body portion 27 is provided with vent passages 32 and 33 which extend to the slot 28 and thus provide a vent opening from the interior of the battery through the vent opening 21 and the passages 33 and 32 to the outer air.

In the form of the invention shown, the body portion 27 has a reduced downward extension 34 which rests on the shoulder at the top of the tubular member 14, when the plug portion is capable of being pushed all the way down into the fill opening in the manner shown in FIGS. 2 and 3. This however is not always possible as will be explained below. Extending downwardly from the reduced portion 34 is a tubular plug portion 35, which has a relatively thin flexible tubular wall, as will be obvious from FIGS. 2, 3 and 5. Provided on the tubular plug portion 35, is a plurality of flexible flanges 36 that are annular in character and of substantially uniform thickness, from the ends thereof where they join the tubular plug portion 35 to the rounded outer ends 37 thereof. Said flexible annular flanges 36 are graduated in height, as will be obvious from FIGS. 2, 3 and 5, the same increasing in height from the lowermost flange 36 to the uppermost flange 36.

When the plug portion 35 is forced into the fill opening by being pushed downwardly into the same, by pressure on the top face of the body portion 26, one or more of the flanges 36 will be distorted as shown in FIGS. 2 and 3, whether the fill opening is threaded as shown at 16 in FIG. 2, or smooth surfaced as shown at 16′ in FIG. 3. This will cause the distorted flanges 36 to be pressed into gripping engagement with the threads 16, or the walls 16′, of the fill openings so as to hold the plug portions in position therein. For the smallest in diameter fill openings, the lowermost flange 36 may be the only one that is distorted, and, if such opening is of such a size that only such engagement of the lowermost flange 36 is possible, it is obvious that the reduced portion 34 of the body portion of the plug will be raised above the top end of the tubular upward extension of the fill opening. However this is immaterial as the plug portion will still be held in closing position in the fill opening as long as one of the flexible flanges 36 will be in gripping engagement therewith.

The lowermost position of the plug portion 35 is shown in FIGS. 2 and 3 to illustrate one of the advantages of our invention. The proper filling of the battery with electrolyte is to the level of the lower side of the inwardly directed flange 17, or 17′, and it will be noted that the entire plug portion 35 is widely spaced upwardly from the liquid level in the battery, even in its lowermost position, as shown in FIG. 2 or 3. When engaged in smaller fill openings it will be still more widely spaced from the liquid. This is important because it is desired to prevent flipping of any of the acid out of the battery by removal of the plug from the fill opening.

The plug portions are removed from the battery fill openings by a single upward movement of the band 18 by pulling upwardly on the end 20 thereof. Obviously, if closure plugs are provided that extend down to the liquid level or near the liquid level in the battery, or even into the liquid, considerable acid will be flipped out of the battery each time that such removal of the closure members is carried out. This is avoided by providing the gripping means on the plug portion in widely spaced relation from the bottom end of the fill opening.

In order to assemble the closure members 26 with the band 18, it is necessary to stretch the band so that the wide portions, between the side edge portions 25 of said band, will be reduced in width so that the same can pass through the narrowest portions of the slots 28 in the closure members. By providing an extensible artificial rubber material, such as extensible neoprene, for the band 18, the band can be put under sufficient tension to permit the assembly of closure members with the band so as to be in the position shown in FIG. 4. Obviously when the tension on the band is released, the closure members will be firmly anchored in their positions on the band 18. The position of the closure members on the band 18 is such that they will be in proper position to have the plug positions 35 thereof introduced into the row of fill openings of the battery, without any tension being placed on the band 18, as any tension on the band 18 will tend to cause the plug portions 35 to be pulled out of the fill openings.

What we claim is:

1. In a closure for storage batteries, a flexible extensible rubber band rectangular in cross section having longitudinally spaced recesses in a side edge thereof, flexible closure members mounted on said band, said closure members each having a body portion provided with a transverse slot rectangular in cross section extending therethrough, said band extending through said slot and said slot having a side wall having a contour conforming to one of said recesses and seating therein, said closure members each having a tubular plug portion having outwardly directed annular longitudinally spaced flexible flanges thereon.

2. The closure for storage batteries claimed in claim 1 in which said recesses are provided in both side edges of said band and both side walls of said slot in each of said closure members have a contour conforming to said recesses.

3. The closure for storage batteries claimed in claim 1 in which said recesses are concave and said side wall of said slot is convex.

4. The closure for storage batteries claimed in claim 1 in which said recesses are provided in both side edges of said band and both side walls of said slot in each of said closure members have a contour conforming to said recesses and in which said recesses are concave and said side walls of said slots are convex.

5. The closure for storage batteries claimed in claim 1 in which said flanges are graduated in height and increase in height from the inner end of said plug portion.

6. The combination with a battery having fill openings therein, of a closure for said openings comprising a flexible, extensible rubber band rectangular in cross section having longitudinally spaced recesses in a side edge thereof, flexible closure members mounted on said band, said closure members each having a body portion provided with a transverse slot rectangular in cross section extending therethrough, said band extending through said slot and said slot having a side wall having a contour conforming to one of said recesses and seating therein, said closure members each having a tubular plug portion having outwardly directed annular longitudinally spaced flexible flanges thereon, said flanges being graduated in height, and increase in height from the inner end of said plug portion, said plug portions extending into said openings to a position in which one of said flanges on each plug portion is distorted by engagement with the wall of the opening into which said plug portion is projected to hold said plug portion in gripping engagement with said wall adjacent the upper end of said fill opening.

7. The combination claimed in claim 6 in which the inner end of said plug portion is widely spaced upwardly from the inner end of said fill opening.

8. The combination claimed in claim 6 in which the wall of said fill opening has an inwardly directed flange at its inner end and the inner end of said plug portion is widely spaced upwardly from said inwardly directed flange.

References Cited

UNITED STATES PATENTS 3,287,173   11/1966   Cox et al.

FOREIGN PATENTS 553,331   12/1956   Italy.
799,552   8/1958   Great Britain.

WINSTON A. DOUGLAS, *Primary Examiner.*

O. F. CRUTCHFIELD, *Assistant Examiner.*